United States Patent
McMahon

(10) Patent No.: US 12,072,042 B2
(45) Date of Patent: Aug. 27, 2024

(54) VALVE SEAT AND A VALVE SEALING ARRANGEMENT OF A VALVE ASSEMBLY

(71) Applicant: Fisher Controls International LLC, Marshalltown, IA (US)

(72) Inventor: Timothy A. McMahon, Mashalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/065,858

(22) Filed: Dec. 14, 2022

(65) Prior Publication Data
US 2024/0200668 A1   Jun. 20, 2024

(51) Int. Cl.
*F16K 5/20* (2006.01)
*F16K 5/06* (2006.01)

(52) U.S. Cl.
CPC ............ *F16K 5/208* (2013.01); *F16K 5/0678* (2013.01); *F16K 5/0689* (2013.01); *F16K 5/201* (2013.01)

(58) Field of Classification Search
CPC .......... F16K 5/201; F16K 5/205; F16K 5/207; F16K 5/208; F16K 5/0689; F16K 5/0673; F16K 5/0678
See application file for complete search history.

(56) References Cited

U.S. PATENT DOCUMENTS

| | | | |
|---|---|---|---|
| 2,191,232 A * | 2/1940 | Heinen | F16K 5/207 277/369 |
| 2,520,288 A * | 8/1950 | Shand | F16K 5/208 74/18 |
| 2,573,177 A * | 10/1951 | Bohlen | F16K 27/107 251/315.15 |
| 3,014,690 A * | 12/1961 | Boteler | F16K 5/202 251/315.11 |
| 3,233,862 A * | 2/1966 | Marsh | F16K 3/0227 251/315.1 |
| 3,266,769 A * | 8/1966 | Shand | F16K 5/207 251/315.08 |

(Continued)

FOREIGN PATENT DOCUMENTS

EP   4234993 A1 *   8/2023   .......... F16K 5/0678

OTHER PUBLICATIONS

Fisher™ Vee-Ball™ V150, V200, and V300 Rotary Control Valves NPS 1 through 12 Instruction Manual, Fisher Controls International LLC, Mar. 2021, 56 pages.

*Primary Examiner* — David Colon-Morales
(74) *Attorney, Agent, or Firm* — Quarles & Brady LLP

(57) ABSTRACT

A valve sealing arrangement is disclosed for use with a valve having a valve body, a control member arranged in a flow passage of the valve body, a rotary shaft arranged in a bore of the valve body configured to move the control member between closed and open positions, and a valve seat. The valve seat can include an anchor portion secured to the valve body that has an anchor section with a first sealing surface and a convolution section extending from the anchor section with at least one bend, a first seat portion with a second sealing surface contacting the control member that is moveable via the at least one bend of the convolution section, and a second seat portion extending from the first seat portion with a contact surface contacting a side wall of the flow passage.

20 Claims, 6 Drawing Sheets

(56) References Cited

U.S. PATENT DOCUMENTS

| | | | | |
|---|---|---|---|---|
| 3,333,813 A * | 8/1967 | Rabe | F16K 5/208 | 251/315.11 |
| 3,394,915 A * | 7/1968 | Gachot | F16K 27/067 | 251/315.04 |
| 3,401,914 A * | 9/1968 | Shand | F16K 5/208 | 251/315.13 |
| 3,446,476 A * | 5/1969 | Scaramucci | F16K 5/0626 | 251/328 |
| 3,525,352 A * | 8/1970 | Jensen | F16K 5/208 | 137/238 |
| 3,554,484 A * | 1/1971 | Gachot | F16K 5/0631 | 251/315.13 |
| 3,570,811 A * | 3/1971 | Kruschik | F16K 5/208 | 251/315.13 |
| 3,712,585 A * | 1/1973 | Grenier | F16K 5/0673 | 251/317 |
| 3,841,347 A * | 10/1974 | Kushida | F16K 5/208 | 251/174 |
| 4,020,864 A * | 5/1977 | Church, Jr. | F16K 5/201 | 251/174 |
| 4,217,923 A * | 8/1980 | Kindersley | F16K 5/0636 | 137/315.21 |
| 4,273,309 A * | 6/1981 | Morrison | F16K 5/201 | 29/896.9 |
| 4,290,581 A * | 9/1981 | Moran | F16K 5/207 | 251/368 |
| 4,747,578 A * | 5/1988 | Kivipelto | F16K 5/207 | 251/315.01 |
| 4,968,000 A * | 11/1990 | Hubertson | F16K 5/205 | 251/315.08 |
| 8,113,484 B2 * | 2/2012 | Hostetter | F16K 5/204 | 251/174 |
| 8,281,798 B2 * | 10/2012 | Dalluge | F16K 5/0689 | 251/315.1 |
| 8,496,226 B2 * | 7/2013 | Dalluge | F16K 5/0636 | 251/315.1 |
| 8,720,854 B2 * | 5/2014 | Dalluge | F16K 5/205 | 251/315.11 |
| 8,733,733 B2 * | 5/2014 | Collison | F16K 5/0636 | 251/315.12 |
| 8,839,680 B2 * | 9/2014 | Anderson | F16K 5/0663 | 73/40 |
| 9,816,625 B2 * | 11/2017 | Warbey | F16J 15/028 | |
| 11,209,089 B2 | 12/2021 | Bergstrom et al. | | |

* cited by examiner

VALVE SEAT AND A VALVE SEALING ARRANGEMENT OF A VALVE ASSEMBLY

BACKGROUND

Flow control devices, including valve assemblies such as control valves, can be used in a wide variety of industrial, commercial, and other setting including to regulate flowrate or pressure of a process fluid flowing from a fluid source. In some applications, a valve seat arranged to engage a control member of a control valve can help to limit leakage of process fluid past the control member. For example, a valve seat that provides a seal with the control member along a flow passage of a control valve can help block unintended leakage of process fluid within the control valve.

SUMMARY

Generally, some examples disclosed herein can provide improved valve seats for sealing of control members of various types of valves. In particular, some example valve seats according to the disclosure can include a resiliently flexible section that allows the valve seat to resiliently move (e.g., radially) in response to forces from fluid flow and pressure within the relevant valve.

Some examples provide a valve sealing arrangement for a valve. The valve sealing arrangement can include a valve body with a flow passage through the valve body, a control member arranged in the flow passage to control flow along the flow passage, with flow along the flow passage extending in an axial flow direction at the control member, a rotary shaft arranged in a bore of the valve body and operatively connected to the control member, the rotary shaft being configured to move the control member about a control member axis between a closed position and an open position to control flow through the flow passage, and a valve seat. The valve seat can include an anchor portion, a first seat portion, and a second seat portion. The anchor portion can be secured to the valve body and can include an anchor section having a first sealing surface that can contact one or more of the valve body or a sealing ring secured to the valve body and thereby provides a first seal against leakage out of the valve body past the anchor section, and a convolution section extending radially from the anchor section along the control member axis. The convolution section can have at least one bend. The first seat portion can be supported relative to the anchor portion by the convolution section and can have a second sealing surface that extends into the flow passage to contact the control member and thereby provide a second seal with the control member along the flow passage. The at least one bend of the convolution section of the valve seat can be bendable such that the first seat portion is movable radially and axially relative to the control member axis. The second seat portion can extend axially from the first seat portion and can have a contact surface that contacts a side wall of the flow passage.

In some examples, a radial sealing element is not disposed between the side wall of the flow passage and the second seat portion to provide a third seal between the side wall and the contact surface. In some examples, the valve seat can be configured such that that the second seat portion is moveable via the convolution section of the anchor portion to permit leakage flow between the valve seat and the side wall of the flow passage into an open space opposite the first seat portion, and the anchor section of the anchor portion can block the leakage flow from flowing past the open space.

In some examples, the valve sealing arrangement can include the sealing ring that can partly define the side wall of the flow passage. In some such examples, the contact surface of the second seat portion of the valve seat can contact the side wall of the flow passage at the sealing ring.

In some examples, the valve seat can be configured such that, when a first force is applied to the first seat portion, the bend of the convolution section has a first length, and, when a second force that is greater than the first force is applied to the first seat portion, the bend of the convolution section has a second length that is less than the first length. In some examples, the first seat portion can be biased radially inward relative to the axial flow direction by the convolution section of the anchor portion. In some examples, the convolution section can have a contour that can offset the anchor portion from the first seat portion relative to the control member axis.

In some examples, the second seat portion can be integrally formed with the first seat portion. In such examples, the anchor portion can be integrally formed with the first seat portion. In some examples, the first sealing surface can be included on a gasket that can extend along one or more of the anchor section or the valve body.

Some examples provide a valve seat. The valve seat can include a first seat portion, a second seat portion, and an anchor portion. The second seat portion can extend from the first seat portion in a first direction and can have a contact surface. The anchor portion can extend from the first seat portion in a second direction that can be substantially perpendicular to the first direction and can include an anchor section and a convolution section. The anchor section can have a first sealing surface that can be configured to provide a first seal. The convolution section can be connected to the first seat portion and can be arranged between the first seat portion and the anchor section. The convolution section can include at least one bend that can be resiliently compressible in the second direction. The first seat portion can have a second sealing surface that can be configured to provide a second seal. The valve seat can be configured such that the first seat portion moves in the second direction when the convolution section of the anchor portion is compressed.

In some examples, the valve seat can be L-shaped. In some examples, a ratio between a thickness of the anchor portion and a height of the at least one bend can be in a range of about 1:4 to 1:100. In some examples, the valve seat can include a metallic or metallic alloy material.

In some examples, at least the anchor portion can be formed via an additive manufacturing process. In such examples, the bend of the convolution section of the anchor portion can be formed of a first material, and at least the anchor section of the anchor portion can be formed of a second material that is different than the first material.

Some examples provide a valve assembly. The valve assembly can include a valve body having an inlet, an outlet, and a flow passage extending in an axial direction from the inlet to the outlet. The valve assembly can further include a control member arranged in the flow passage to control flow along the flow passage and a valve seat. The valve seat can include an anchor portion and a first seat portion. The anchor portion can be secured to the valve body and can include an anchor section and a convolution section. The anchor section can have a first sealing surface that can contact one or more of the valve body or a sealing ring secured to the valve body and thereby provides a first seal against leakage out of the valve body past the anchor section. The convolution section can extend radially from the anchor section transverse to the axial direction and can have at least one bend. The first seat portion can be supported relative to the anchor portion by the convolution section and can have a second sealing surface that extends into the flow passage to contact the control member and thereby provide a second seal with the control member along the flow passage. The at least one bend of the convolution section of the anchor portion can be bendable such that the first seat portion is moveable radially and axially relative to the control member.

In some examples, the first seat portion of the valve seat is biased radially inward relative to the axial direction by the convolution section of the anchor portion.

In some examples, the valve seat can further include a second seat portion extending axially from the first seat portion. The second seat portion can have a contact surface that contacts a side wall of the flow passage. In such examples, the control member can be spherical shaped and can be rotatable about a control member axis between an open position and a closed position, the valve seat can be an annular seat such that the first seat portion contacts an outer surface of the control member, and the second seat portion can be an annular disc that can extend axially outward from the first seat portion relative to the control member axis.

Some examples provide a method of forming a valve seat for a valve that can include a valve body, a flow passage with a side wall, and a valve element movable to open and close the flow passage. The method can include forming an anchor portion of the valve seat via an additive manufacturing process. The anchor portion can include an anchor section and a convolution section. The anchor section of the anchor portion can have a first sealing surface configured to provide an anchor-section seal with the valve body. The convolution section of the anchor portion can have at least one bend and can secure the anchor portion to a first seat portion of the valve seat, with the anchor portion extending from the first seat portion in a first direction and a second seat portion of the valve seat extending from the first seat portion in a second direction that is substantially perpendicular to the first direction. The first seat portion can have a second sealing surface configured to provide a valve element seal with the valve element. The second seat portion can have a contact surface configured to contact the side wall of the flow passage. The convolution section can be resiliently compressible during operation to move the first seat portion in the first direction toward the anchor portion.

In some examples, the method can further include forming the first and second seat portions of the valve seat via an additive manufacturing process, such that the second seat portion is integrally formed with the first seat portion. In such examples, the anchor section can be integrally formed with the first and second seat portions.

In some examples, the method can further include forming the first seat portion of the valve seat via an additive manufacturing process, such that the anchor portion is integrally formed with the first seat portion.

In some examples, the at least one bend of the convolution section can be formed of a first material, and the anchor section can be formed of a second material that is different than the first material.

Some examples provide a valve sealing arrangement. The valve sealing arrangement can include a valve body assembly that defines a flow passage in an axial direction, a control member arranged in the flow passage to control flow along the flow passage via rotation about a control member axis, and a valve seat arranged within a valve seat cavity of the valve body assembly. The valve seat can include an anchor portion, a first seat portion, and a second seat portion. The anchor portion can be secured to the valve body assembly and can include an anchor section and a convolution section. The anchor section can have a first sealing surface that contacts an inner surface of the valve seat cavity and thereby provide a valve seat seal against leakage out of the valve body. The convolution section can extend radially inward from the anchor section substantially perpendicular to the control member axis and can have at least one bend. The first seat portion can be supported relative to the anchor portion by the convolution section and can have a second sealing surface that extends into the flow passage to contact the control member and thereby provide a first control member seal with the control member along the flow passage. The at least one bend of the convolution section of the valve seat can be bendable such that the first seat portion is movable radially and axially relative to the control member axis. The second seat portion can extend axially from the first seat portion away from the control member axis.

In some examples, the second seat portion of the valve seat can be biased toward the control member axis by a spring arranged in the valve seat cavity.

In some examples, the valve seat can be removable from the valve seat cavity of the valve body. In such examples, the valve sealing arrangement can further include a valve body end cap removably attached to the valve body that can define the valve seat cavity, and the valve seat can be removable from the valve seat cavity when the valve body end cap is detached from the valve body. In such examples, the valve sealing arrangement can further include a second valve seat arranged in the valve body that can have a second valve seat sealing surface configured to contact the control member and thereby provide a second control member seal with the control member along the flow passage upstream of the first control member seal.

In some examples, the second seat portion can be integrally formed with the first seat portion. In such examples, the anchor portion can be integrally formed with the first seat portion.

BRIEF DESCRIPTION OF THE DRAWINGS

The accompanying drawings, which are incorporated in and form a part of this specification, illustrate examples of the disclosed technology and, together with the description, serve to explain the principles of the disclosed technology.

DETAILED DESCRIPTION

Figure 1:
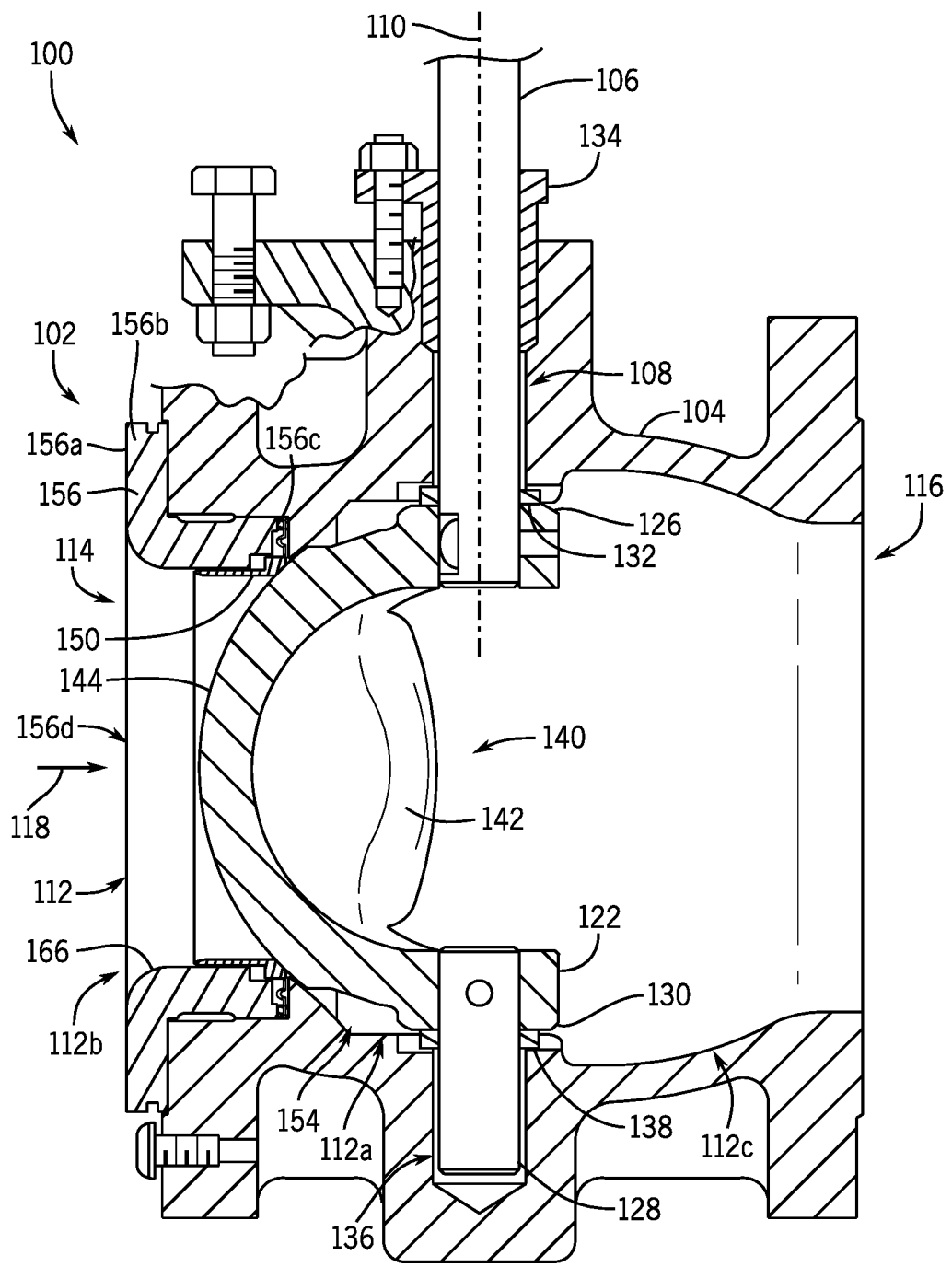
FIG. 1 is a cross-sectional view of an example of a valve assembly with a valve sealing arrangement in accordance with principles of the disclosed technology.

The following discussion is presented to enable a person skilled in the art to make and use examples of the disclosed technology. Various modifications to the illustrated examples will be readily apparent to those skilled in the art, and the generic principles herein can be applied to other examples and applications without departing from disclosed technical principles. Thus, the disclosed technology is not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of the disclosed technology. Skilled artisans will recognize the examples provided herein have many useful alternatives and fall within the scope of this disclosure as a whole.

Before any examples are explained in detail, it is to be understood that the present disclosure is not limited in its application to the details of construction and the arrangement of components set forth in the following description or illustrated in the attached drawings. The disclosed technology is capable of other configurations and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, flow control devices, including various valve assemblies, can be used to control flow of a process fluid from a fluid source toward a downstream component or application. A valve assembly, for example, can have a main valve inlet and a main valve outlet. A main flow passage can extend between the main valve inlet and the main valve outlet and through a main valve body. The main valve body can typically include a flow control assembly with a control member, such as a valve plug or a valve disc, for example, to manipulate or control a process fluid or gas flowing through the valve assembly. The control member is typically moved by an operating member, such as a sliding valve stem or a rotary shaft, that extends through a bore in the valve body. To block leakage flow of process fluid or gas around the control member, a valve seat is typically arranged within the valve body to provide a seal at contact with the control member when the control member is in a closed position (and, in some cases, including for ball valves, also in an open position).

Many process applications utilize one or more control valves arranged along one or more locations of a system flow path of process fluid to control flow of process fluid through the system (e.g., selectively block the flow or otherwise manage pressure or flowrate). In some applications, particularly those involving high pressure or high temperature flow, process fluid can leak past a seal provided by a valve seat that is engaged by a control member of the control valve during operation. Modern control valves, such as a ball valve having an annular valve seat, for example, utilize a sealing ring arranged within a flow passage of a valve body to secure the valve seat against the control member and thus maintain a control member seal (i.e., the seal provided by the valve seat in contact with the control member) to block leakage flow past or around the control member. However, these conventional configurations of a valve seat can cause the valve seat to remain stationary relative to a control member that may shift or move relative to the valve seat during operations, which can be detrimental to the performance of a control member seal provided by the valve seat. In addition, leakage flow past the control member seal can be detrimental to the lifespan of the control valve and to the surrounding environment as process fluid can leak from the control valve.

Examples of the disclosed technology can address these issues, including by providing a valve seat that maintains enhanced contact with the control member during operations or that provides a control member seal having increased consistency and effectiveness during continued operations (as compared to conventional arrangements). For example, some examples provide a valve sealing arrangement including a valve seat that has an anchor portion secured to the valve body to provide a first seal, a first seat portion that is connected to the anchor portion and contacts the control member to provide a second seal (i.e., a control member seal), and a second seat portion connected to the first seat portion that contacts an inner wall of the flow passage (e.g., which can be at least partially defined by the other components of the valve assembly, such as a sealing ring, for example). The anchor portion of the valve seat can include an anchor section that provides the first seal and a convolution section arranged between the anchor portion and the first seat portion. The convolution section can include at least one bend that is resiliently bendable or compressible such that, during operations of the valve assembly, the first seat portion is moveable relative to the valve body (e.g., radially and axially relative to an axial flow direction) to maintain adequate contact with the control member. In addition, the first seat portion of the valve seat can be biased radially inward by the convolution section to further assist in maintaining contact with control member. Thus, when the control member shifts or moves during operations, a moveable and biased first seat portion of a valve seat can provide a more consistent and effective control member seal as compared to conventional valve sealing arrangements.

The valve sealing arrangement can be configured such that operational flow of process fluid can assist the valve seat in providing the control member seal. For example, in some cases, a seat portion (e.g., second seat portion) of a valve seat of a valve sealing arrangement can also be moveable via a convolution section connected to an anchor portion. In such examples, the valve seat can be configured such that leakage flow past the second seat portion into an open space located behind the first seat portion between the valve seat and the valve body is blocked by the first seal of the anchor portion. As described in greater detail below, some permitted leakage flow into the open space of the valve seat can further assist in biasing the first seat portion axially toward the control member and can thus provide an even further effective control member seal during operation of the valve assembly.

Some examples can provide a valve seat for use in a valve sealing arrangement. For example, in some cases, a valve seat can include a first seat portion and a second seat portion extending from the first seat portion in a first direction (e.g., in parallel with a flow direction through the relevant valve). The second seat portion can have a contact surface configured to contact the valve body (e.g., with a side wall of a flow passage of the ball valve). An anchor portion can extend from the first seat portion in a second direction that is substantially perpendicular to the first direction (e.g., perpendicular to the flow direction through the relevant valve). The anchor portion of the valve seat can include an anchor section having a first sealing surface configured to provide a first seal (e.g., with a valve body of the relevant valve) and a convolution section that is connected to the first seat portion and arranged between the first seat portion and the anchor section so as to support the first seat portion relative to the anchor section (e.g., and thereby the relevant valve body). The convolution section of the anchor portion can include at least one bend that is resiliently compressible in the second direction. Further, the first seat portion can have a second sealing surface configured to provide a second seal (e.g., with a control member of a ball valve). Thus, the first seat portion and the second sealing surface that is configured to provide the second seal (e.g., a control member seal) can move in the second direction when the convolution section of the anchor portion is compressed (e.g., to accommodate corresponding movement of a ball of a ball valve during operation).

A valve seat can be formed such that a convolution section provides particular movement of the first seat portion to increase the effectiveness of a control member seal for particular applications. For example, in some cases, at least an anchor portion of a valve seat can be formed via an additive manufacturing process or can include two or more materials (e.g., a bend of a convolution section can be formed of a relatively more elastic material while the rest of the anchor portion can be formed of a relatively more rigid material). Such an arrangement, for example, can further increase the performance of a seal provided by the first seat portion that is supported relative to the anchor portion. In addition, in such examples, the use of an additive manufacturing process to form an anchor portion having two or more materials can allow for valve seats that provide increased strength while reducing potential leakage past otherwise required assembly seams compared to conventional manufacturing processes.

Some examples can provide a valve assembly having a valve seat. For example, in some cases, the valve assembly includes a valve body having an inlet, an outlet, and a flow passage extending in an axial direction from the inlet to the outlet, a control member arranged in the flow passage to control flow along the flow passage, and a valve seat. The valve seat can include an anchor portion and a first seat portion. The anchor portion can be secured to the valve body and can include an anchor section and a convolution section. The anchor section can have a first sealing surface that contacts the valve body and provides a valve seat seal against leakage out of the valve body past the anchor section. The convolution section can extend radially from the anchor section transverse to the axial direction and can have at least one bend. The first seat portion can be supported relative to the anchor portion by the convolution section and can have a second sealing surface that extends into the flow passage to contact the control member and thereby provide a second seal (i.e., a control member seal) with the control member along the flow passage. The at least one bend of the convolution section of the anchor portion can be bendable such that the first seat portion (having the second sealing surface) is moveable radially and axially relative to (and with) the control member. Thus, the movable first seat portion via the convolution section of the anchor portion provides a control member seal (i.e., the second seal) of the valve assembly that consistently blocks flow past the control member during operations of the valve assembly, including during axial displacement of the valve member.

The valve seat of the valve assembly can be configured to sealingly engage various control members having varying configurations (e.g., various dimensions and shapes). For example, in some cases, the control member is spherical shaped and is rotatable about a control member axis between an open position and a closed position. Thus, in such examples, the valve seat can be an annular seat such that the first seat portion contacts an outer surface of the control member and the second seat portion is an annular disc extending axially outward from the first seat portion relative to the control member axis.

Some examples can also provide a method of forming a valve seat for a valve assembly, including a valve assembly having a sealing arrangement as described above. In some examples, the method can include forming at least an anchor portion of the valve seat via an additive manufacturing process. In some examples, two or more of an anchor portion, a first seat portion, and a second seat portion can be integrally formed via one or more additive manufacturing processes. In such examples, the integrally formed portions of the valve seat can reduce potential leakage past otherwise required assembly seams between the portions compared to conventional manufacturing processes.

The principles of the present disclosure are applicable to various types of valve assemblies, such as sliding stem control valves and rotary shaft control valves, for example, as well as various valve sealing arrangements that can have various valve seat configurations, such as integral or insert types, for example, that can be comprised of various materials, such as metallics, metallic alloys, or polymers, for example.

Figure 2:
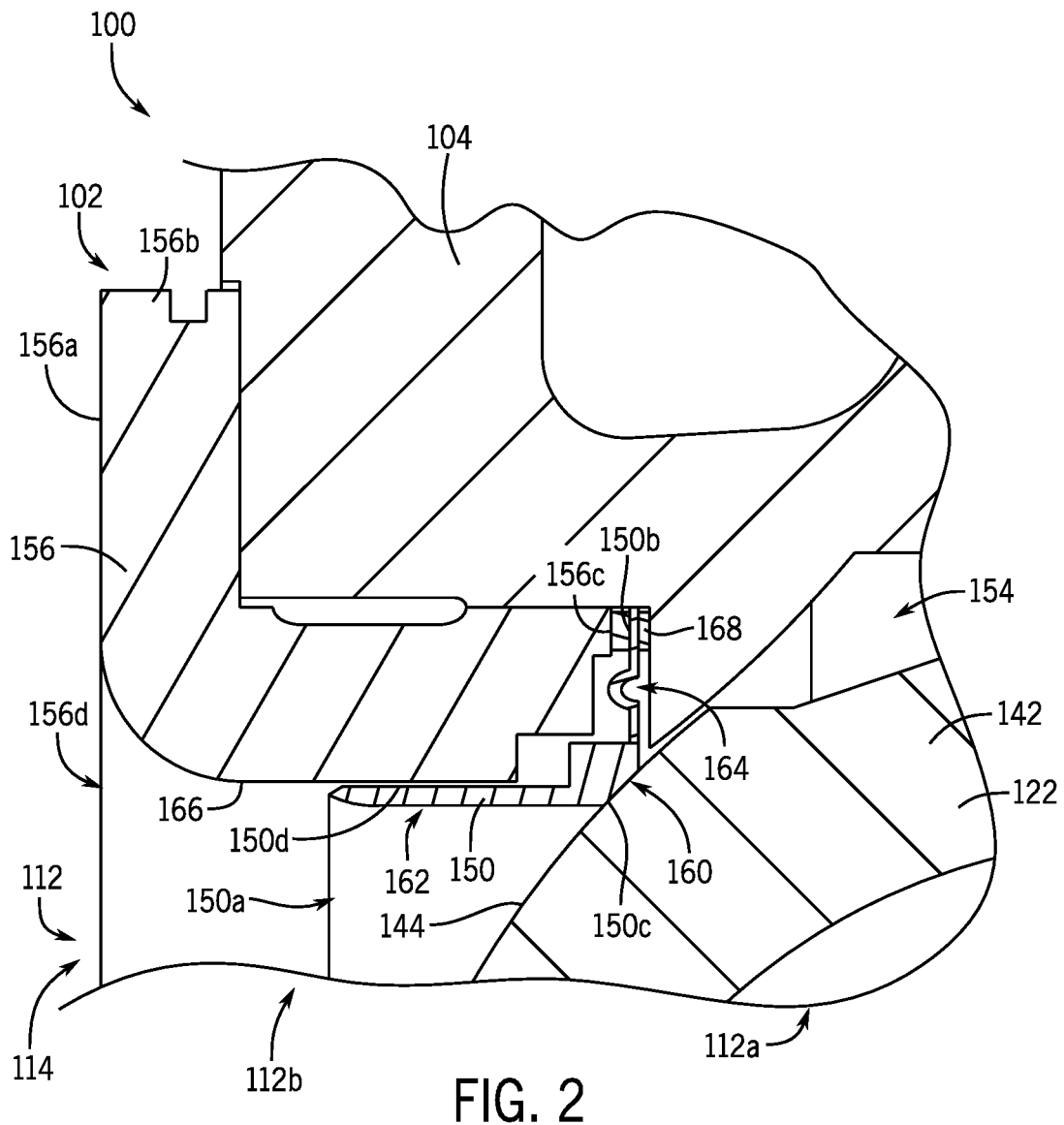
FIG. 2 is a detailed view of the valve sealing arrangement of the valve assembly of FIG. 1.
Figure 3:
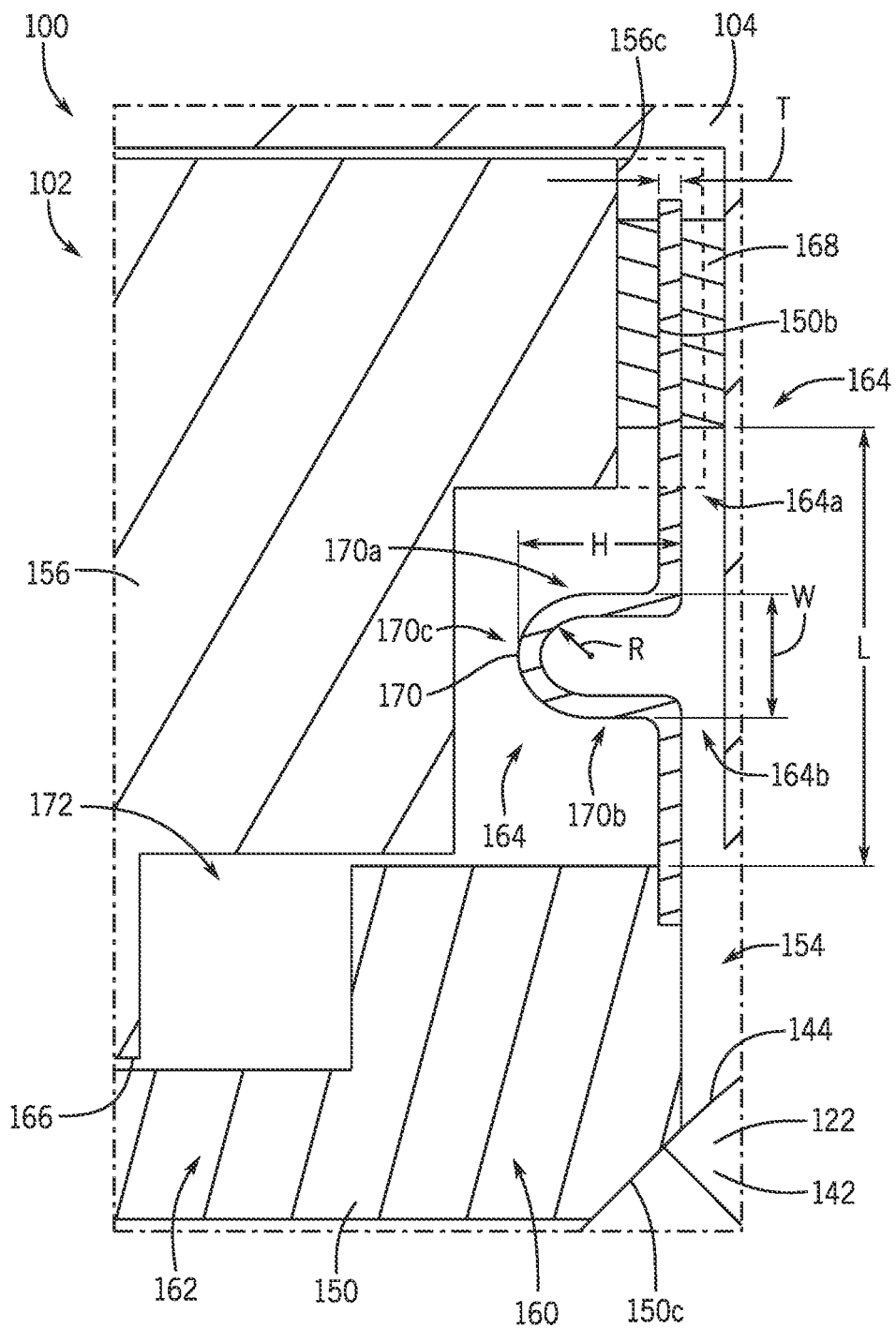
FIG. 3 is a detailed view of a valve seat of the valve sealing arrangement of FIG. 2.

Referring now to FIGS. 1-3, an example of a valve assembly 100 is illustrated. Referring specifically to FIG. 1, the valve assembly 100 is a control valve of the rotary shaft type, having a sealing arrangement 102 in accordance with the principles of the present disclosure. The valve assembly 100 includes a valve body 104 and an operating member, shown as rotary shaft 106, that extends through a bore 108 formed in the valve body 104 along a bore or control member axis 110. A valve flow passage 112 extends through the valve body 104 between an inlet 114 and an outlet 116 and provides a path for a process liquid or gas to flow through the valve assembly 100 in an axial flow direction 118 from the inlet 114 to the outlet 116. The process liquid or gas may be any fluid, including steam, liquid water, natural gas, oil or other chemical compounds. The flow passage 112 is opened and closed by a control member 122, which is operably connected to and movable by the rotary shaft 106 between a closed position (as shown in FIG. 1) and an open position (not shown) within a flow control section 112a of the flow passage 112 to control flow along the flow passage 112 between a flow inlet section 112b and a flow outlet section 112c. In the illustrated example, the control member axis 110 is substantially perpendicular to the axial flow direction 118. In some examples, the control member axis 110 can be oblique to the axial flow direction 118.

In the illustrated example of FIG. 1, the valve assembly 100 is of the ball valve type, more specifically a segmented ball valve, with the control member 122 being generally spherical shaped along a side portion and generally open opposite from the spherical side portion. This specific type of ball valve can be particularly advantageous to flow control in high pressure applications, in that the control member 122 may require only a quarter or 90 degree rotation about the control member axis 110 within the flow control section 112a to move between the closed and open positions. More specifically, the control member 122 is rotatable via the rotary shaft 106, which is coupled to a first or upper side 126 of the control member 122. In addition, the control member 122 is further secured against movement in the axial flow direction 118 by a follower shaft 128, which is coupled to a second or lower side 130 of the control member 122 opposite the upper side 126. The rotary shaft 106 extends into the bore 108 of the valve body 104 and through a rotary shaft bearing 132 to the upper side 126 of the control member 122. In some cases, a packing arrangement (not shown) can be arranged with the bore 108 between the rotary shaft bearing 132 and a packing follower 134 that extends partially into the bore 108. The follower shaft 128 is arranged within a socket 136 of the valve body 104. The socket 136 can be concentric with the bore 108 such that the follower shaft 128 is concentric with both the rotary shaft 106 and the control member axis 110. A follower shaft bearing 138 can be arranged between the socket 136 and the lower side 130 of the control member 122.

In some examples, the valve assembly 100 can be one of various types of ball valves (such as, e.g., full port, standard port, multi-port, or reduced-port ball valve types) and the control member 122 can be arranged in various configurations (such as, e.g., a trunnion mounted ball valve). Accordingly, the control member 122 and other components (e.g., components of a valve body) of the valve assembly 100 can be different than as illustrated.

Controlled movement (i.e., rotation) of the control member 122 is accomplished by operatively coupling the control member 122 to an actuator (not shown) by way of the rotary shaft 106. The actuator controllably rotates the rotary shaft 106 about the control member axis 110 of the bore 108 in at least one rotational direction, thereby causing the control member 122 to rotate between the open and closed positions, as well as other intermediate positions. With the valve assembly 100 in a closed configuration, as shown in FIG. 1 in particular, the control member 122 is in the closed position such that a control member passage 140 defined in a control member body 142 of the control member 122 is disposed toward the outlet 116 of the valve body 104 while the control member body 142 blocks flow through the flow control section 112a of the flow passage 112 from the inlet 114. With the valve assembly 100 in an open configuration (not shown), the control member 122 is in the open position (not shown) such that the control member passage 140 is aligned with the axial flow direction 118 and the inlet 114 thereby permitting flow through the control member passage 140 (i.e., the flow control section 112a) to the outlet 116. The valve assembly 100 is configured such that in each of the closed and open positions (and in any one of a plurality of intermediate positions) of the control member 122, a valve seat 150 of the sealing arrangement 102 sealingly engages an outer surface 144 of the control member body 142 to block flow of process fluid along the outer surface 144 to other downstream areas of the valve assembly 100 (e.g., the bore 108 or an interior cavity 154 of the valve body 104).

Referring specifically to FIG. 2, the sealing arrangement 102 of the valve assembly 100 is shown in greater detail. In the illustrated example, the valve seat 150 is removably secured within the inlet 114 of the valve body 104 by a sealing ring 156. More specifically, the sealing ring 156 has a first or outer end 156a with a sealing ring rim or flange 156b, a second or inner end 156c opposite the outer end 156a, and a sealing ring opening 156d extending through the outer and inner ends 156a, 156c. In the illustrated example, with the sealing ring 156 arranged on the valve body 104, the sealing ring opening 156d at least partly defines the flow inlet section 112b of the flow passage 112 and is concentric with a valve seat opening 150a of the valve seat 150. The sealing ring flange 156b extends radially outward from the outer end 156a and is removably secured to the valve body 104 about the inlet 114 while the inner end 156c extends toward the control member 122 (and the control member axis 110). The valve seat 150 is arranged between the inner end 156c of the sealing ring 156 and the outer surface 144 of the control member 122. In some examples, at least a portion of the valve seat 150 can be secured to the valve sealing ring 156 (e.g., at the inner end 156c). In some examples, at least a portion of the valve seat 150 can be integrally formed with the valve sealing ring 156. In some examples, at least a portion of the valve seat 150 can also be at least partially arranged within the sealing ring opening 156d. In some examples, the valve assembly 100 may not include the sealing ring 156. In such examples, the valve seat 150 can be arranged between the control member 122 and the valve body 104, or the valve seat 150 can be integrally formed with the valve body 104.

With continued reference to FIG. 2, the valve seat 150 includes a first seat portion 160, a second seat portion 162 extending axially from the first seat portion 160, and an anchor portion 164 extending radially from the first seat portion 160. The anchor portion 164 is secured to the valve body 104 between the inner end 156c of the sealing ring 156 and the valve body 104. The anchor portion 164 has a first sealing surface 150b (see FIG. 3) that can contact one or both of the valve body 104 or the inner end 156c of the sealing ring 156 and thereby provide an anchor-portion seal (e.g., a first seal) against leakage out the valve body 104. The first seat portion 160 is supported relative to the anchor portion 164, which extends radially outward relative to the control member axis 110 (e.g., in a first direction) from the first seat portion 160. A second sealing surface 150c of the first seat portion 160 extends toward the flow passage 112 to contact the outer surface 144 of the control member 122 and thereby provide a first-seat seal (e.g., a second or control member seal) with the control member 122 along the flow passage 112. The second seat portion 162 extends axially outward relative to the control member axis 110 (e.g., in a second direction that is substantially perpendicular to the first direction) from the first seat portion 160 along a side wall 166 of the flow passage 112 (i.e., in the illustrated example, the flow inlet section 112b of the flow passage 112, which is at least partly defined by the sealing ring opening 156d). Thus, a contact surface 150d of the second seat portion 162 can contact the side wall 166 (i.e., the inner surface of the sealing ring opening 156d) of the flow passage 112. In some examples, the contact surface 150d can be a third sealing surface that can provide a second seat seal (e.g., a third seal).

In the illustrated example, to provide an adequate seal with the generally spherical shaped outer surface 144 of the control member 122, the valve seat 150 is an annular seat with the valve seat opening 150a extending through a center of an annular body, and a generally L-shaped cross-sectional profile taken along a perimeter of the valve seat 150. As such, the second seat portion 162 is an annular disc extending axially outward from the first seat portion 160 relative to the control member axis 110 (see FIG. 1) along the side wall 166 of the flow inlet section 112b of the flow passage 112. In some examples, the valve seat 150 can be an annular seat formed of two or more valve seat bodies (e.g., a first semicircular body and a second semicircular body).

Referring specifically to FIG. 3, the anchor portion 164, the first seat portion 160, and (partially) the second seat portion 162 of the valve seat 150 are shown in greater detail. The anchor portion 164 includes an anchor section 164a having the first sealing surface 150b and a convolution section 164b extending radially inward from the anchor section 164a along the control member axis 110 (see FIG. 1). One or more radial sealing elements (such as, e.g., a gasket 168) can be arranged between the first sealing surface 150b and at least the valve body 104 (and, as illustrated, the inner end 156c of the sealing ring 156). The gasket 168 can be comprised of any suitable materials for a particular application (e.g., graphite). In some examples, part of the anchor section 164a (e.g., the first sealing surface 150b) can be otherwise fixedly (and sealedly) attached to the inner end 156c of the sealing ring 156 (or to other parts of the valve body 104), including by a seal weld or the like. As illustrated by the dashed lines extending from the inner end 156c of the sealing ring 156 in FIG. 3, in some examples, the anchor section 164a can be secured to the sealing ring 156 adjacent to the inner end 156c and one or more radial sealing elements (such as, e.g., the gasket 168) can be arranged between the inner end 156c of the sealing ring 156 and the valve body 104. In some such examples, the anchor section 164a can be slidably received within a slot formed on the sealing ring 156 adjacent to the inner end 156c. In other such examples, the anchor section 164a can be integrally formed with the sealing ring 156 adjacent to the inner end 156c.

The convolution section 164b of the anchor portion 164 can include at least one convolution (such as, e.g., a rounded bend 170) disposed between the anchor section 164a and the first seat portion 160. In the illustrated example, the bend 170 extends axially outward from the control member axis 110 (see FIG. 1) and is configured such that the anchor portion 164 is aligned with the first seat portion 160 relative to the control member axis 110. In some examples, the bend 170 can extend axially inward toward the control member axis 110. In some examples, the convolution section 164b can have a contour (including the bend 170) such that the convolution section 164b offsets the anchor portion 164 from the first seat portion 160 relative to the control member axis 110.

To provide a consistent second seal between the valve seat 150 and the control member 122, along with improved sealing performance during operations of the valve assembly 100, the valve seat 150 is configured such that the first seat portion 160 is biased radially inward relative to the axial flow direction 118 (see FIG. 1) by the convolution section 164b (and the bend 170) of the anchor portion 164, when the valve seat 150 is installed with the control member body 142 at a neutral axial location. In other words, the valve seat 150 can be sized so that an inner radius of the annular profile of the valve seat 150, at the sealing surface 150c, is smaller than a local outer radius of the control body member 142 (i.e., as measured vertically from the perspective of FIG. 3) when the convolution section 164b is in a neutral configuration.

In addition, the bend 170 of the can be resiliently compressible or bendable such that the first seat portion 160 is moveable radially and axially relative to the control member axis 110 (see FIG. 1) to further ensure a consistent second seal. For example, the valve seat 150 can be configured such that, when a first force is applied to the first seat portion 160 (such as by flow through the flow passage 112 at a first pressure), the bend 170 has a first width W corresponding to the convolution section 164b having a first length L (e.g., as shown in FIG. 3). Further, when a second force that is greater than the first force is applied to the first seat portion 160 (e.g., by flow through the flow passage 112 at a second pressure that is greater than the first pressure), the bend 170 compresses and has a second width corresponding to the convolution section 164b having a second length that is smaller than the first length L, with the second width being smaller than the first width W. Similarly, in some examples, when the second force is applied to the seat portion 160, the bend 170 can deform (i.e., a cross-sectional profile of the bend 170 changes in shape or orientation relative to when the first force is applied) such that at least the anchor section 164a is offset from the first seat portion 160.

Further, as shown particularly in FIG. 3, the bend 170 of the convolution section 164b has a first or upper section 170a, a second or lower section 170b opposite the upper section 170a, and a third or central section 170c arranged between the upper and lower sections 170a, 170b. In the illustrated example, the bend 170 is rounded with a radius R and a height H along the central section 170c. Further, the anchor portion 164, including each of the anchor section 164a and the convolution section 164b (and the bend 170), has a uniform thickness T. In some examples, a ratio between a thickness of at least the convolution section 164b and a radius of the bend 170 can be in a range about 1:1 to about 1:20, about 1:2 to about 1:15, or about 1:3 to about 1:10. In some examples, a ratio between a thickness of at least the convolution section 164b (e.g., a maximum thickness) and a height of the bend 170 can be in a range of about 1:2 to about 1:16, about 1:3 to about 1:12, or about 1:4 to about 1:8. In some examples, this ratio can be between about 1:4 and about 1:100. In some examples, at least the convolution section 164b of the anchor portion 164 can have a varying thickness. For example, in some cases, the bend 170 can have a first thickness and the rest of the convolution section 164b can have a second thickness that is different than the first thickness. In some examples, the bend 170 of the convolution section 164b can have a varying thickness T. For example, in some cases, one or more of the sections 170a, 170b, 170c of the bend 170 can have a thickness that differs from that of one or more of the other sections 170a, 170b, 170c.

It is contemplated that the convolution section 164b of the anchor portion 164 of the valve seat 150 can include two or more bends in some cases (e.g., similar to the bend 170). For example, in some cases, the convolution section 164b can include a first or inner bend adjacent to the first seat portion 160 and a second or outer bend adjacent to the anchor section 164a. In such examples, first and second bends of the convolution section 164b can have a similar height, width, thickness, or radius. In some examples, a first bend of the convolution section 164b can have one or more of a height, width, thickness, or radius that is different the corresponding dimension of a second bend. In some examples, a first bend of the convolution section 164b can extend axially outward from the control member axis 110 and a second bend can extend at an angle relative to the first bend or can extend axially inward from the control member axis 110. In some examples, a first bend of the convolution section 164b can have a cross-sectional profile or other shape that differs from that of a second bend. For example, in some cases, a first bend of the convolution section 164b can be a rounded bend with a radius and a second bend can have a triangular cross-sectional profile.

It is further contemplated that some portions (e.g., at least the anchor portion 164) of the valve seat 150 can have two or more sections formed of differing materials. For example, in some cases, the anchor section 164a can be formed of a first material and the convolution section 164b can be formed of a second material that has different properties (e.g., more elastic properties) than the first material. In such examples, the first material can have a first elasticity and the second material can have a second elasticity that is greater than the first elasticity. In some examples, the bend 170 of the convolution section 164b can be formed of a third material that has different properties (e.g., more elastic properties) than each of the first and second materials.

To further provide a consistent second seal between the valve seat 150 and the control member 122, along with improved sealing performance during operations of the valve assembly 100, the valve seat 150 can be configured such that leakage flow from the flow inlet section 112b is permitted to flow into an open space 172 located opposite the first seat portion 160 between the valve seat 150 and the valve body 104. Such leakage flow into the open space 172 of the valve seat 150 can help to bias the first seat portion 160 at least axially in the direction of axial flow direction 118 (i.e., toward the control member axis 110), in parallel with the first seat portion 160 being biased radially inward relative to the axial flow direction 118 by the convolution section 164b of the anchor portion 164. Accordingly, in the illustrated example, a separate radial sealing element is not disposed between the side wall 166 of the flow passage 112 and the contact surface 150d of the second seat portion 162. In addition, the valve seat 150 can be configured such that the second seat portion 162 is moveable, via the convolution section 164b of the anchor portion 164, to permit leakage flow between the valve seat 150 and the side wall 166 of the flow passage 112 into the open space 172 opposite the first seat portion 160, while the anchor section 164a of the anchor portion 164 blocks such leakage flow from flowing past the open space 172 into the interior cavity 154 of the valve body 104.

In some examples, the valve seat 150 can be configured such that the second seat portion 162 fully blocks leakage flow between the valve seat 150 and the side wall 166 of the flow passage 112 into the open space 172 via the contact surface 150d. For example, in some cases, a radial sealing element (e.g., a gasket) can be disposed between the side wall 166 of the flow passage 112 and the contact surface 150d to provide the third seal.

It is contemplated that one or more of the first seat portion, the second seat portion, and the anchor portion 160, 162, 164 of the valve seat 150 can be integrally formed with one or more of the other portions 160, 162, 164. For example, in some cases, the anchor portion 164 or the second seat portion 162 can be integrally formed with the first seat portion 160. In some examples, the valve seat 150 can be formed as a single unitary piece such that each of the anchor portion 164 and the second seat portion 162 are integrally formed with the first seat portion 160.

A variety of other configurations of the sealing arrangement 102 of the valve assembly 100, including the valve seat 150, are possible to facilitate the benefits of the valve assembly 100 as discussed above. Further, a variety of configurations of sealing arrangements of other types of valve assemblies are possible to facilitate the benefits of the valve assembly 100 having the sealing arrangement 102 as discussed above. An additional example configuration implemented in another example valve assembly will be described in greater detail below with reference to FIGS. 4-6.

Figure 4:
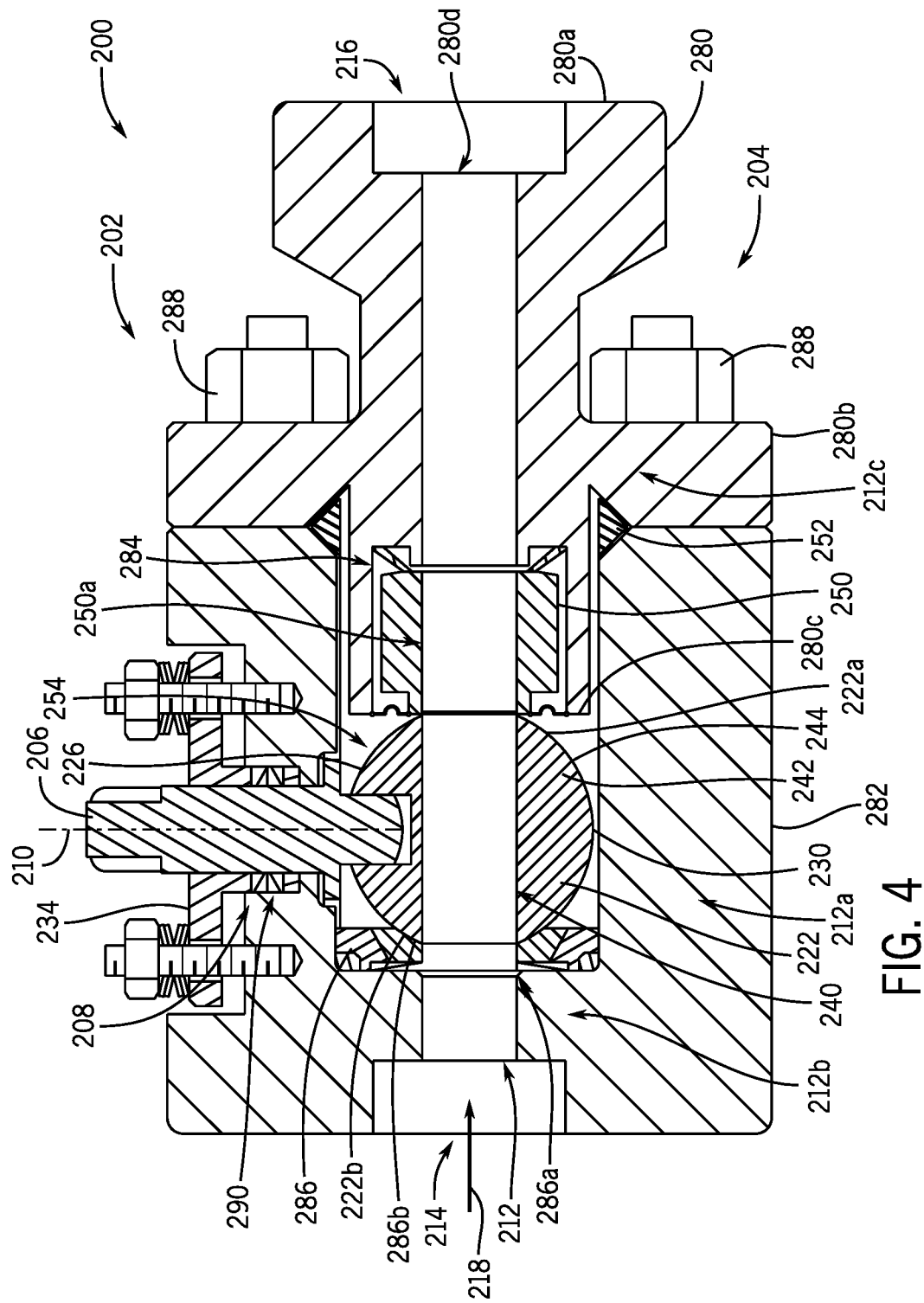
FIG. 4 is a cross-sectional view of another example of a valve assembly with a valve sealing arrangement in accordance with principles of the disclosed technology.
Figure 5:
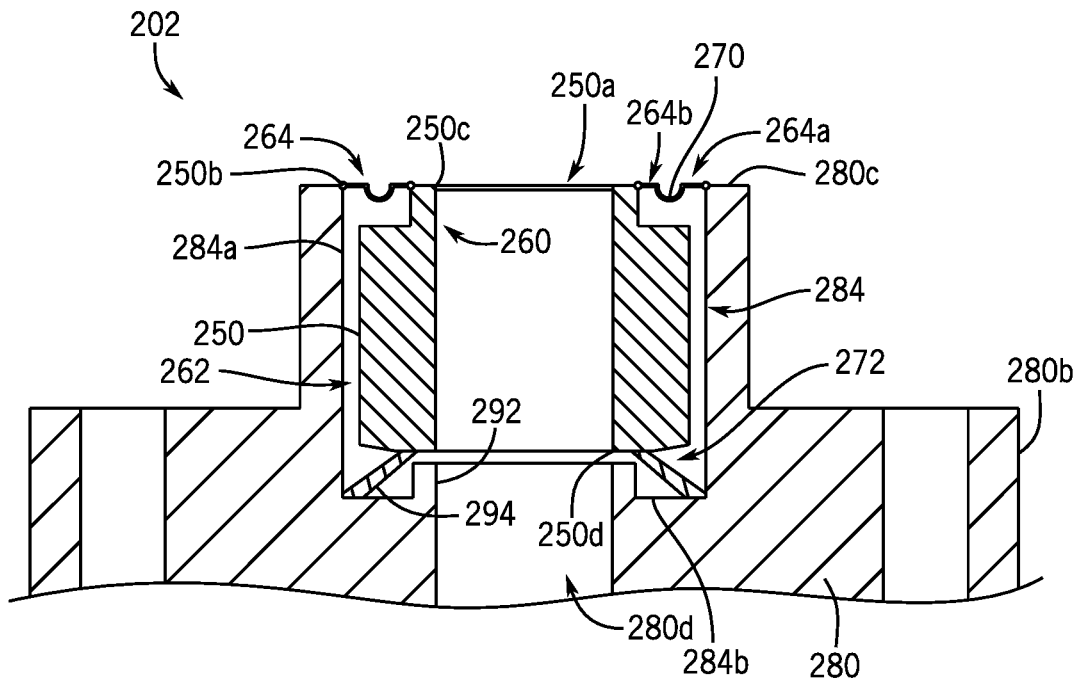
FIG. 5 is a detailed view of the valve sealing arrangement of the valve assembly of FIG. 4.
Figure 6:
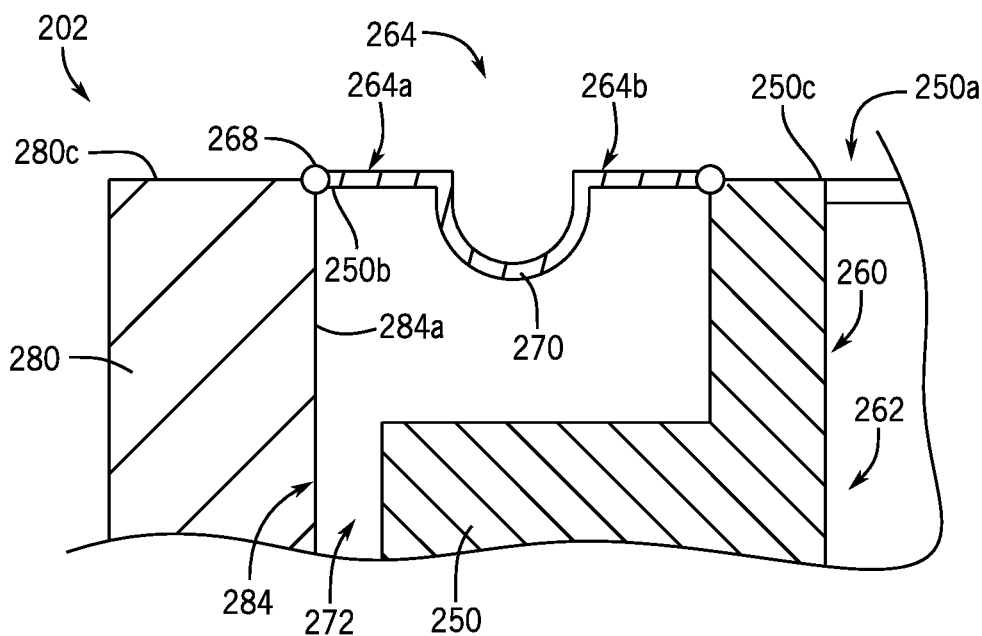
FIG. 6 is a detailed view of a valve seat of the valve sealing arrangement of FIG. 5.

Referring now to FIGS. 4-6, another example of a valve assembly 200 is depicted, which has a sealing arrangement 202 in accordance with principles of the present disclosure. The valve assembly 200 is similar to the previously discussed example valve assembly 100, with like elements being indicated by similar reference numerals under the "200 series" of reference numerals.

In some aspects, the valve assembly 200 is similar to the previously discussed example valve assembly 100. For example, similarly to the valve assembly 100, the valve assembly 200 is a control valve of the rotary shaft type and includes a valve body 204 and a rotary shaft 206, that extends through a bore 208 formed in the valve body 204 along a control member axis 210. A valve flow passage 212 extends through the valve body 204 between a valve inlet 214 and a valve outlet 216 and provides a path for a process liquid or gas to flow through the valve assembly 200 in an axial flow direction 218 from the valve inlet 214 to the valve outlet 216. The flow passage 212 is opened and closed by a control member 222 which is operably connected to and movable by the rotary shaft 206.

Other aspects between the valve assemblies 100, 200 may differ. In contrast to the valve assembly 100, for example, the valve assembly 200 is a floating full-port ball valve type, such that the control member 222 is coupled only to the rotary shaft 206 at an upper side 226 of the control member 222 (i.e., with a lower side 230 of the control member 222 being free). Further, the control member 222 is secured in a flow control section 212a of the flow passage 212 along the axial flow direction 218 by a valve body end adapter 280 (or valve body end cap) that is coupled to (and in fluid communication with) the valve body outlet 216 and at least partially defines a flow outlet section 212c of the flow passage 212. Thus, in the illustrated example, the valve body 204 is a valve body assembly including a valve main body 282 coupled with the end adapter 280.

Referring specifically to FIG. 4, the end adapter 280 has a first or outer end 280a with a flange 280b, a second or inner end 280c opposite the outer end 280a, and an end adapter opening 280d extending through the outer and inner ends 280a, 280c. A downstream valve seat 250 (e.g., a first valve seat) of the sealing arrangement 202 is arranged within a valve seat cavity 284 defined in the inner end 280c of the end adapter 280. The downstream valve seat 250 has a downstream valve seat opening 250a (e.g., a first valve seat opening) that is concentric with the end adapter opening 280d, such that the downstream valve seat opening 250a and the end adapter opening 280d together define the flow outlet section 212c of the flow passage 212 (with the valve outlet 216 being defined by a downstream end of the adapter opening 280d). The downstream valve seat 250 is configured to contact and provide a downstream seal (e.g., a first control member seal) with an outer surface 244 of the control member 222 along a downstream side 222a (e.g., a first side) of the control member 222 to block flow around the control member 222 into an interior cavity 254 of the valve main body 282.

Referring still to FIG. 4, the sealing arrangement 202 further includes an upstream valve seat 286 (e.g., a second valve seat) that is arranged (or integrally formed) within the flow control section 212a adjacent to a flow inlet section 212b of the flow passage 212. The upstream valve seat 286 can be configured to contact and provide an upstream seal (e.g., a second control member seal) with the outer surface 244 of the control member 222 along an upstream side 222b (e.g., a second side) of the control member 222 to block flow around the control member 222 into the interior cavity 254 of the valve main body 282. Similar to the downstream valve seat 250, the upstream valve seat 286 includes an upstream valve seat opening 286a that is concentric with the valve inlet 214 of the valve main body 282 along the flow inlet section 212b of the flow passage 212.

In the illustrated example, the end adapter 280 is removably secured to the valve main body 282 by fasteners 288 and the downstream valve seat 250 is removably received in the valve seat cavity 284 of the end adapter 280. Thus, in some cases, the downstream valve seat 250 can be removable from the valve seat cavity 284 of the end adapter 280 when the end adapter 280 is detached from the valve main body 282. In some examples, the downstream valve seat 250 can be integrally formed with the end adapter 280 or with the valve main body 282.

As shown in FIG. 4 particularly, the control member 222 has a generally spherical shaped control member body 242 that defines a control member passage 240 extending through the downstream side 222a and the upstream side 222b of the control member body 242. Movement (i.e., rotation) of the control member 222 is accomplished by operatively coupling the control member 222 to an actuator (not shown) by way of the rotary shaft 206. The actuator controllably rotates the rotary shaft 206 axially along the control member axis 210 of the valve main body 282 in at least one rotational direction, thereby causing the control member 222 to rotate between the open and closed positions, as well as other intermediate positions.

With the valve assembly 200 in a closed configuration (not shown), the control member 222 is in the closed position (not shown) such that the control member passage 240 is disposed substantially perpendicular to the axial flow direction 218 and thereby flow through the flow control section 212a of the flow passage 212 from the inlet 214 is blocked by the outer surface 244 of the control member body 242. With the valve assembly 200 in an open configuration, as shown in FIG. 4 in particular, the control member 222 is in the open position such that the control member passage 240 is aligned and generally parallel with the axial flow direction 218 and the inlet 214 and thereby flow through the downstream valve seat opening 250a and through the end adapter opening 280d to the outlet 216 is permitted via the control member passage 240. Thus, in the illustrated example, the control member passage 240 of the control member 222 at least partially defines the flow control section 212a of the flow passage 212.

The valve assembly 200 is configured such that in each of the closed and open positions (and in any one of a plurality of intermediate positions) of the control member 222, the outer surface 244 of the control member body 242 is simultaneously sealingly engaged by each of the downstream and upstream valve seats 250, 286 of the sealing arrangement 202 to block process fluid from flowing along the outer surface 244 of the control member body 242 to other areas of the valve assembly 200 (e.g., the bore 208). More specifically, with the control member 222 in either of the open or closed positions, the upstream valve seat 286 blocks leakage flow from the inlet 214 into the interior cavity 254 of the valve main body 282, and, with the control member 222 in the open position, the upstream valve seat 250 blocks leakage flow between the control member passage 240 (i.e., the flow control section 212a) into the interior cavity 254 of the valve main body 282.

As shown in FIG. 4, the sealing arrangement 202 can also include one or more radial sealing members 252 that can be arranged between the valve main body 282 and the end adapter 280 to block any leakage flow out of the valve body 204 through the end adapter 280. In addition, to prevent any leakage flow within the interior cavity 254 of the valve main body 282 through the bore 208 and out the valve assembly 200, the sealing arrangement 202 can further include a packing arrangement 290 and a packing follower 234 arranged within the bore 208 about the rotary shaft 206. Further, to ensure an adequate seal between the control member 222 and the downstream and upstream valve seats 250, 286, at least the upstream valve seat 286 can be compressible such that the control member 222 compresses the upstream valve seat 286 as the fasteners 288 of the end adapter 280 are further tightened to the valve main body 282.

Referring specifically to FIG. 5, the downstream valve seat 250 arranged within the valve seat cavity 284 of the end adapter 280 is shown in greater detail. The downstream valve seat 250 includes a first seat portion 260, a second seat portion 262, and an anchor portion 264. In particular, the second seat portion 262 extends axially from the first seat portion 260 away from the control member axis 210 (see FIG. 4), and the anchor portion 264 extends radially outward from the first seat portion 260 relative to the axial flow direction 218 (see FIG. 4).

In the illustrated example, the anchor portion 264 is secured to the valve body assembly 204 (specifically, to the inner end 280c of the end adapter 280) and has a first sealing surface 250b contacting an inner surface 284a of the valve seat cavity 284 of the end adapter 280 to provide an anchor-portion seal (e.g., a first seal or a first valve seat seal) against leakage into the valve seat cavity 284. The first seat portion 260 is supported relative to the anchor portion 264 and has a second sealing surface 250c extending into the flow passage 212 that contacts the outer surface 244 of the control member 222 to provide a first-seat seal (e.g., a second seal or the first control member seal) with the control member 222 along the flow passage 212 (see FIG. 4). The second seat portion 262 extends axially from the first seat portion 260 away from the control member 222 (and the control member axis 210) along the axial flow direction 218. The second seat portion 262 has a contact surface 250d adjacent to a rim 292 that protrudes axially upward from an inner wall 284b of the valve seat cavity 284 toward the control member axis 210. In some cases, the contact surface 250d may be a third sealing surface that can provide a second-seat seal (e.g., a third seal or a second valve seat seal) against leakage into an open space 272 behind the anchor portion 264.

Referring back to FIG. 4, the upstream valve seat 286 has an upstream valve seat sealing surface 286b (e.g., a second valve seat sealing surface) that contacts the upstream side 222b of the control member 222 and thereby provides the upstream seal (e.g., the second control member seal) with the control member 222 along the flow passage 212 that is upstream of the downstream seal (e.g., the first control member seal) provided by the second sealing surface 250c of the first seat portion 260 of the downstream valve seat 250.

Referring specifically to FIG. 6, the anchor portion 264, the first seat portion 260, and (partially) the second seat portion 262 of the valve seat 250 are shown in greater detail. The anchor portion 264 includes an anchor section 264a and a convolution section 264b. The anchor section 264a has the first sealing surface 250b that is in contact with (e.g., bonded to) the inner surface 284a of the valve seat cavity 284. The convolution section 264b extends radially inward from the anchor section 264a toward the first seat portion 260, substantially perpendicular to the control member axis 210. In some cases, the valve seat 250 can be bonded to (e.g., welded or adhered to) the inner end 280c of the end adapter 280, including at a contact formation 268 and can be similarly (or otherwise) secured to the first seat portion 260 of the valve seat 250, or other sealing arrangements can be provided.

The convolution section 264b of the anchor portion 264 includes at least one convolution (e.g., a bend 270) that is disposed between the anchor section 264a and the first seat portion 260. In the illustrated example, the bend 270 of the convolution section 264b extends axially outward from the control member axis 210 (see FIG. 4) and the anchor portion 264 is aligned with the first seat portion 260 relative to the control member axis 210. In some examples, the convolution section 264b can have a contour (including the bend 270) such that the convolution section 264b offsets the anchor portion 264 from the first seat portion 260 relative to the control member axis 210.

To provide a consistent downstream seal between the downstream valve seat 250 and the control member 222 (i.e., the first control member seal or the second seal of the downstream valve seat 250) with improved sealing performance during operations of the valve assembly 200, the downstream valve seat 250 is configured such that the first seat portion 260 is biased radially inward relative to the axial flow direction 218 (see FIG. 4) by the convolution section 264b (and the bend 270) of the anchor portion 264 when the valve seat 250 is centered relative to the flow direction 218. Further, the bend 270 of the convolution section 264b can be compressible or bendable such that the first seat portion 260 is moveable radially and axially relative to the control member axis 210 (see FIG. 4) by the convolution section 264b to ensure maintained contact between the first sealing surface 250c of the first seat portion 260 and the control member 222. For example, in some cases, the convolution section 264b and the bend 270 can be configured with the same ratios or other characteristics as discussed relative to the previous example valve seat 150 of FIGS. 1-3 having the convolution section 164b and bend 170.

In addition, a spring 294 is arranged between the inner wall 284b of the valve seat cavity 284 of the end adapter 280 and the second seat portion 262 to bias the downstream valve seat 250 (particularly the first seat portion 260) toward the control member axis 210 (i.e., in a direction opposite the flow direction 218). Further, in some cases, the downstream valve seat 250 can be configured such that leakage flow from the flow outlet section 212c is permitted to flow between the rim 292 of the valve seat cavity 284 and the second seat portion 262, through the spring 294, and into the open space 272 of the valve seat cavity 284 opposite the anchor portion 264. Such leakage flow into the open space 272 of the valve seat cavity 284 may help bias the first seat portion 260 of the downstream valve seat 250 at least axially toward the control member axis 210 (and the control member 222), in parallel with the convolution section 264b (and the bend 270) of the anchor portion 264 biasing the first seat portion 260 radially inward relative to the axial flow direction 218. Accordingly, in the illustrated example, a radial sealing element is not disposed between the third sealing surface 250c of the second seat portion 262 and the rim 292 of the valve seat cavity 284.

In some examples, the spring 294 can be configured such that the contact surface 250d cannot contact the rim 292 during operations of the valve assembly 200 and thereby leakage flow from the flow outlet section 212c is permitted to flow freely into the valve seat cavity 284 between the inner wall 284b and the contact surface 250d. In such examples, the spring 294 can be further configured such that the leakage flow is blocked by the spring 294 into the open space 272 of the valve seat cavity 284. In such examples, the leakage flow into the valve seat cavity 284 that is blocked by the spring 294 can apply pressure to the spring 294 at least axially toward the control member axis 222 and may help further bias the first seat portion 260 of the downstream valve seat 250 in parallel with a spring force of the spring 294.

It is contemplated that one or more of the first seat portion, the second seat portion, and the anchor portion 260, 262, 264 of the downstream valve seat 250 can be integrally formed with one or more of the other portions 260, 262, 264. For example, in some cases, the anchor portion 264 or the second seat portion 262 can be integrally formed with the first seat portion 260. In some examples, the downstream valve seat 250 can be formed as a single unitary piece such that each of the anchor portion 264 and the second seat portion 262 are integrally formed with the first seat portion 260. Further, in some examples, the spring 294 can be integrally formed with at least the second seat portion 262 of the downstream valve seat 250.

While the valve assemblies 100, 200 having the sealing arrangements 102, 202, respectively, have been described in connection with control valves, the scope of the present disclosure is not limited to these implementations. A wide variety of devices that include a moving control member that regulates or controls flow within a flow passage can be improved by the sealing arrangement of the present disclosure.

Referring to FIGS. 1-6, various components of the example valve sealing arrangements 102, 202, including one or more components or structures of the valve seats 150, 250, may be formed through additive manufacturing techniques or processes, such as 3D printing. To that end, a number of additive manufacturing processes may be implemented (e.g., vat photopolymerization, material jetting, binder jetting, powder bed fusion, material extrusion, directed energy deposition, sheet lamination, direct metal laser melting, electron beam melting, or sintering) to form the valve seats 150, 250 of a number of materials, including metals, metal alloys, ceramics (e.g., zirconia, alumina, or tricalcium phosphate), or polymers (e.g., acrylonitrile butadiene styrene, polylactic acid, polycarbonate, or polyvinyl alcohol). For example, in some cases, the valve seat 150 as shown in FIGS. 1-3, including the anchor portion 164 and the first and second seat portions 160, 162, can be integrally formed as a single unitary piece. In other examples, at least the anchor portion 164 of the valve seat 150 may be formed separate from and later coupled with the first seat portion 160 of the valve seat 150. In some examples, one or more sections of the anchor portion 164 (such as, e.g., the convolution section 164b) may be formed with a first material and other sections of the anchor portion 164 (such as, e.g., the anchor section 164a) may be formed with a second material having one or more properties that differ from the first material.

In some implementations, devices or systems (e.g., a valve assembly or components of a valve assembly, such as a sealing arrangement) disclosed herein can be utilized, manufactured, or installed using methods embodying aspects of the present disclosure. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as examples of the disclosed technology, of the utilized features and implemented capabilities of such device or system.

Figure 7:
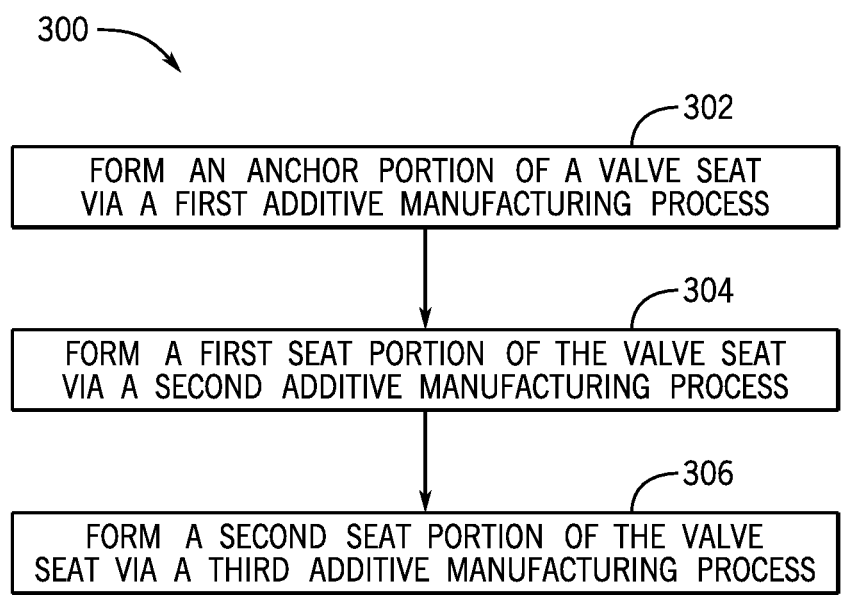
FIG. 7 is a flowchart illustrating a method of forming a valve seat in accordance with principles of the disclosed technology.

In this regard, for example, FIG. 7 illustrates a method 300 of forming a valve seat. By way of example, the method 300 will be described below with reference to the valve seat 150 of the valve assembly 100 of FIGS. 1-3. However, other valve seats (e.g., the valve seat 250 of FIGS. 3-6) for other valve assemblies (e.g., the valve assembly 200 of FIGS. 3-6) can be formed according to other example implementations of the disclosed method.

In the illustrated example, operation 302 of method 300 includes forming an anchor portion of the valve seat (such as, e.g., the anchor portion 164 of the valve seat 150) via a first additive manufacturing process. The first additive manufacturing process of operation 302 (and any of the other additive manufacturing processes of method 300 described below) can utilize a variety of additive manufacturing techniques (such as, e.g., any one or more of the additive manufacturing techniques previously mentioned herein) utilizing a variety of materials (such as, e.g., any one or more of the materials previously mentioned herein) to form the anchor portion of the valve seat (or any other portion of the valve seat). In some examples, operation 302 can include forming at least one bend of a convolution section of the anchor portion (such as, e.g., the bend 170 of the convolution section 164b of the anchor portion 164) with a first material and forming an anchor section of the anchor portion (such as, e.g., the anchor section 164a of the anchor portion 164) with a second material that is different than the first material.

The method 300 can further include operation 304, which includes forming a first seat portion of the valve seat (such as, e.g., the first seat portion 160 of the valve seat 150) via a second additive manufacturing process. In some examples, operations 302, 304 can be combined such that the anchor portion and the first seat portion of the valve seat are each formed via the first additive manufacturing process (i.e., so that the first and second additive manufacturing processes are the same). Generally, the anchor portion and the first seat portion of the valve seat can be integrally formed (such as, e.g., by a single additive manufacturing process) or can be formed separately (such as, e.g., by two separate additive manufacturing processes) and later coupled together (such as, e.g., via welding).

The method 300 can further include operation 306, which includes forming a second seat portion of the valve seat (such as, e.g., the second seat portion 162 of the valve seat 150) via a third additive manufacturing process. In some examples, operations 304, 306 can be combined such that the first and second seat portions of the valve seat are each formed via the second additive manufacturing process (i.e., so that the second and third additive manufacturing processes are the same). In such examples, the first and second seat portions of the valve seat can be integrally formed or can be formed separately and coupled together.

In some examples, operations 302, 304, 306 of method 300 can be combined such that the anchor portion, the first seat portion, and the second seat portion of the valve seat are each formed via the first additive manufacturing process (i.e., such that a single additive manufacturing process is used for all three of these portions of the valve seat). In such examples, two or more of the anchor portion, the first seat portion, and the second seat portion of the valve seat can be integrally formed or can be formed separately and coupled together. Thus, in some examples, the method 300 can include only operation 302 to form a single unitary piece valve seat having an anchor portion, a first seat portion, and a second seat portion via one or more additive manufacturing processes.

In some examples, aspects of the disclosed technology, including computerized implementations of methods according to the present disclosure, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, some examples can be implemented as a set of instructions, tangibly embodied on a non-transitory computer-readable media, such that a processor device can implement the instructions based upon reading the instructions from the computer-readable media. Some examples can include (or utilize) a control device such as an automation device, a special purpose or general purpose computer including various computer hardware, software, firmware, and so on, consistent with the discussion below.

For example, in some implementations of the present disclosure, a non-transitory computer-readable medium can store instructions (such as, e.g., a computer-aided design (CAD) file of one or more portions of a valve seat) for an additive manufacturing device (e.g., a 3D printer that can be configured as a stereolithography, a selective laser sintering, or a fused deposition fabrication printer). When executed by a processor of the additive manufacturing device, the instructions can cause the additive manufacturing device to form one or more portions of a valve seat (such as, e.g., by at least one of operations 302, 304, 306 of the method 300 of FIG. 7).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the present disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular implementations. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Throughout the disclosure, the terms "about" and "approximately" are intended to refer to a range of values±5% (or less) of the numeric value that the term proceeds, inclusive.

The use herein of the term "axial" and variations thereof refers to a direction that extends generally along an axis of symmetry, a central axis, or an elongate direction of a particular component or system. For example, an axially-extending structure of a component can extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component can generally extend at least partly along a direction that is perpendicular to a longitudinal or central axis of that component. The use herein of the term "circumferential" and variations thereof refers to a direction that extends generally around a circumference or periphery of an object, around an axis of symmetry, around a central axis, or around an elongate direction of a particular component.

Also as used herein, unless otherwise limited or defined, "substantially parallel" indicates a direction that is within±12 degrees of a reference direction (e.g., within +6 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction. Similarly, also as used herein, unless otherwise limited or defined, "substantially perpendicular" indicates a direction that is within±12 degrees of perpendicular a reference direction (e.g., within±6 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Some discussion above refers to an object or member being "L-shaped." As used herein, unless otherwise specified or limited, the term "L-shaped" specifies a shape that includes at least two base portions that extend in generally transverse directions from each other. In some examples, an "L-shaped" member can include base portions extending at a substantially right angle relative to the other base portion (i.e., deviating from right angles by less than 5 degrees), with or without curved, chamfered, or otherwise non-square connecting regions between the base portions. In some examples, an "L-shaped" member can include a first base portion that extends as part of a continuous (e.g., non-angled) curve from either end of a straight or curved second base portion. Thus, for example, some "L-shaped" members may have half-rectangular (e.g., with curved or angled corner(s)) or other similar cross-sectional profiles." Further, some "L-shaped" members may include a first base portion that is longer than a second base portion.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

As described herein, examples of the disclosed technology can provide a valve assembly having a sealing arrangement with a valve seat and a method of forming a valve seat. The previous description is provided to enable any person skilled in the art to make or use the disclosed technology. Various modifications to the disclosed examples will be readily apparent to those skilled in the art, and the generic principles defined herein may be applied to other examples without departing from the spirit or scope of the disclosure. Thus, the disclosure is not intended to be limited to the examples shown herein but is to be accorded the widest scope consistent with the principles and novel features disclosed herein.

The invention claimed is:

1. A valve sealing arrangement comprising:
   a valve body with a flow passage through the valve body;
   a control member arranged in the flow passage to control flow along the flow passage, with flow along the flow passage extending in an axial flow direction at the control member;
   a rotary shaft arranged in a bore of the valve body and operatively connected to the control member, the rotary shaft being configured to move the control member about a control member axis between a closed position and an open position to control flow through the flow passage; and a valve seat including:
  an anchor portion secured to the valve body, the anchor portion including: an anchor section having a first sealing surface that contacts one or more of the valve body or a sealing ring secured to the valve body and thereby provides a first seal against leakage out of the valve body past the anchor section; and a convolution section extending from the anchor section radially, relative to the axial flow direction, the convolution section having at least one bend;
  a first seat portion supported relative to the anchor portion by the convolution section, the first seat portion having a second sealing surface that is radially opposite the convolution section, relative to the axial flow direction, and that extends into the flow passage to contact the control member and provide a second seal with the control member along the flow passage, the at least one bend of the convolution section of the valve seat being resiliently bendable such that the first seat portion is movable radially and axially relative to the control member axis; and
  a second seat portion extending from the first seat portion axially, relative to the axial flow direction and the control member, with a contact surface that contacts a side wall of the flow passage.

2. The valve sealing arrangement of claim 1, wherein a radial sealing element is not disposed between the side wall of the flow passage and the second seat portion to provide a third seal between the side wall and the contact surface.

3. The valve sealing arrangement of claim 1, wherein the valve seat is configured such that that the second seat portion is moveable, via the convolution section of the anchor portion, to permit leakage flow between the valve seat and the side wall of the flow passage into an open space opposite the first seat portion; and
  wherein the anchor section of the anchor portion blocks the leakage flow from flowing past the open space.

4. The valve sealing arrangement of claim 1, wherein the valve sealing arrangement includes the sealing ring and the sealing ring partly defines the side wall of the flow passage; and
  wherein the contact surface of the second seat portion of the valve seat contacts the side wall of the flow passage at the sealing ring.

5. The valve sealing arrangement of claim 1, wherein the valve seat is configured such that, when a first force is applied to the first seat portion, the convolution section of the anchor portion extends radially with a first length, and, when a second force that is greater than the first force is applied to the first seat portion, the convolution section of the anchor portion extends radially with a second length that is less than the first length.

6. The valve sealing arrangement of claim 1, wherein the first seat portion is biased radially inward relative to the axial flow direction by the convolution section of the anchor portion.

7. The valve sealing arrangement of claim 1, wherein a contour of the convolution section offsets the anchor portion from the first seat portion relative to the control member axis.

8. The valve sealing arrangement of claim 1, wherein the second seat portion is integrally formed with the first seat portion.

9. The valve sealing arrangement of claim 8, wherein the anchor portion is integrally formed with the first seat portion.

10. The valve sealing arrangement of claim 1, wherein the first sealing surface is included on a gasket that extends along one or more of the anchor section or the valve body.

11. A valve seat, comprising:
  a first seat portion;
  a second seat portion extending from the first seat portion in a first direction, the second seat portion having a contact surface configured to contact a flow passage of a valve that defines an axial flow direction substantially parallel to the first direction; and
  an anchor portion extending from the first seat portion in a second direction that is substantially perpendicular to the first direction, the anchor portion including:
    an anchor section having a first sealing surface being configured to provide a first seal within the valve; and
    a convolution section connected to the first seat portion, the convolution section being arranged between the first seat portion and the anchor section and including at least one bend that is resiliently compressible in the second direction;
  wherein the first seat portion has a second sealing surface that is configured to provide a second seal within the valve, the second sealing surface being aligned with the convolution section along the second direction; and
  wherein the valve seat is configured such that the first seat portion moves in the second direction when the convolution section of the anchor portion is compressed.

12. The valve seat of claim 11, wherein the valve seat is L-shaped.

13. The valve seat of claim 11, wherein a ratio between a thickness of the anchor portion and a height of the at least one bend is in a range of about 1:4 to 1:100.

14. The valve seat of claim 11, wherein the valve seat includes a metallic or metallic alloy material.

15. The valve seat of claim 11, wherein at least the anchor portion is formed via an additive manufacturing process.

16. The valve seat of claim 11, wherein the at least one bend of the convolution section of the anchor portion is formed of a first material, and at least the anchor section of the anchor portion is formed of a second material that is different than the first material.

17. A valve assembly, comprising:
  a valve body including an inlet, an outlet, and a flow passage extending from the inlet to the outlet;
  a control member arranged in the flow passage to control flow in an axial direction along the flow passage; and
  a valve seat including:
    an anchor portion secured to the valve body, the anchor portion including: an anchor section having a first sealing surface that contacts one or more of the valve body or a sealing ring secured to the valve body and thereby provides a first seal against leakage out of the valve body past the anchor section; and a convolution section extending from the anchor section transverse to the axial direction, the convolution section having at least one bend; and
    a first seat portion supported relative to the anchor portion by the convolution section, the first seat portion having a second sealing surface that extends into the flow passage to contact the control member and thereby provide a second seal with the control member along the flow passage, with the convolution section of the anchor portion and the second sealing surface of the first seat portion aligned along a second direction that is substantially perpendicular to the axial direction;

wherein the at least one bend of the convolution section of the anchor portion is resiliently bendable such that the first seat portion is moveable radially and axially relative to the control member.

18. The valve assembly of claim 17, wherein the first seat portion of the valve seat is biased radially inward relative to the axial direction by the convolution section of the anchor portion.

19. The valve assembly of claim 17, wherein the valve seat further includes a second seat portion extending axially from the first seat portion, the second seat portion having a contact surface that contacts a side wall of the flow passage.

20. The valve assembly of claim 19, wherein the control member is spherical shaped and is rotatable about a control member axis between an open position and a closed position; and wherein the valve seat is an annular seat such that the first seat portion contacts an outer surface of the control member and the second seat portion is an annular disc extending axially outward from the first seat portion relative to the control member axis.

* * * * *